United States Patent [19]

Tojo

[11] Patent Number: 4,875,690
[45] Date of Patent: Oct. 24, 1989

[54] SEAL DEVICE FOR RECIPROCATING PUMP

[75] Inventor: Nobuo Tojo, Mobara, Japan

[73] Assignee: Maruyama Mfg. Co. Inc., Tokyo, Japan

[21] Appl. No.: 177,954

[22] Filed: Apr. 5, 1988

[30] Foreign Application Priority Data

Apr. 17, 1987 [JP] Japan .................................. 62-92972

[51] Int. Cl.$^4$ .............................................. F16J 15/18
[52] U.S. Cl. ...................................... 277/12; 277/58;
277/124; 277/125; 277/126
[58] Field of Search ............ 277/12, 32, 58, 123–126, 277/165

[56] References Cited

U.S. PATENT DOCUMENTS

| | | |
|---|---|---|
| 1,752,475 | 4/1930 | Ashworth . |
| 2,010,930 | 8/1935 | Rowe . |
| 2,029,463 | 2/1936 | Clark .............................. 277/123 X |
| 2,201,478 | 5/1940 | Czarnecki, Jr. et al. . |
| 2,684,274 | 7/1954 | Saxon ................................. 277/58 X |
| 2,844,392 | 7/1958 | Stonich et al. ...................... 277/124 |
| 2,886,352 | 5/1959 | Krellner . |
| 3,039,780 | 6/1962 | Nordell . |
| 3,088,416 | 5/1963 | Danis . |
| 3,429,401 | 2/1969 | Johnson .......................... 277/124 X |
| 3,512,787 | 5/1970 | Kennedy et al. ................ 277/124 X |
| 3,577,833 | 5/1971 | Skelton . |
| 4,417,734 | 11/1983 | Sundberg . |
| 4,437,821 | 3/1984 | Ogawa . |

FOREIGN PATENT DOCUMENTS 52-39054 3/1977 Japan .................................. 277/123
55-60762 5/1980 Japan .................................... 277/58

Primary Examiner—Robert S. Ward, Jr.
Attorney, Agent, or Firm—Birch, Stewart, Kolasch & Birch

[57] ABSTRACT

A sealing device for a reciprocating pump of the type having a pump housing provided with a bore formed therein. The bore is provided at its one end with an opening through which it communicates with the exterior of the pump housing while the other end of the bore receives a reciprocating member such as a plunger. The sealing device includes a seal case received in the bore and having a bore through which the reciprocating member extends, a sealing member such as a packing held on the inner periphery of the seal case and having an inner peripheral surface adapted to be slidingly contacted by the outer peripheral surface of the reciprocating member, a closure separate from the pump housing and removably attached to the pump housing so as to close the opening on the one end of the bore, and a coiled compression spring loaded between the closure and either one of the seal case and the sealing member.

15 Claims, 4 Drawing Sheets

SEAL DEVICE FOR RECIPROCATING PUMP

BACKGROUND OF THE INVENTION

1. Field of the Invention

The present invention relates to a sealing device for use in a reciprocating pump and, more particularly, to a sealing device which is improved to facilitate replacement of a sealing member incorporated in the sealing device and adapted to make a sliding contact with the reciprocating movement of the pump so as to provide a seal on the reciprocating member.

2. Description of the Prior Art

A reciprocating pump has a pump housing which defines therein a pump chamber for receiving a reciprocating member. In general, the pump housing is composed of a plurality of parts which are assembled together on, for example, the crank case of the pump. In order to seal the pump chamber while allowing the reciprocating member to move reciprocatingly, a sealing device is provided which has a sealing member held in sliding contact with the reciprocating member. The sealing member is worn down during operation of the pump and, hence, needs periodical renewal.

The renewal of the sealing member essentially requires disassembly of the pump housing. Since the pump housing is comparatively heavy, the disassembly is rather difficult and dangerous. Proposals have been made as to a technique which enables the sealing member to be renewed without requiring disassembly of the pump housing. For instance, Japanese Patent Publication No. 18722/1978 and Japanese Patent Application No. 200145/1986 propose arrangements in which a pump chamber has an opening formed in an end wall of the pump housing and a seal case which holds a sealing member on its inner periphery is designed to be inserted into and withdrawn from the opening. In this known arrangement, the seal case is composed of two integral portions: namely, a closure portion for closing the opening in the pump housing and a seal holding portion for holding the sealing member.

This known structure suffers from the following disadvantages.

(a) The seal case is essentially required to have bores which provide passages between the pump chamber on the inner side of the seal case and a suction port and a delivery port which are outside the seal case. The unitary construction composed of the closure portion and the seal holding portion complicates the seal case construction and increases the size of the same. This not only raises the production cost but also increases the weight of the seal case requiring a laborious work for the handling.

(b) The seal case is subjected to the high pressure produced in the pump chamber so that it is required to withstand a high pressure.

(c) In general, the pump housing includes a first manifold having a suction port and a second manifold having a delivery port and assembled on the distal end of the first manifold. Therefore, the seal case is installed in such a manner as to engage with both the first and the second manifolds. Consequently, the seal case is required to have a function for locating and centering the first and the second manifolds, so that the seal case and the first and the second manifolds are required to have high dimensional precision.

(d) As explained before, the seal case is essentially required to have bores which provide passages between the pump chamber on the inner side of the seal case and a suction port and a delivery port which are outside the seal case. This poses another problem in that the cross-sectional areas of the bores are limited in order to ensure sufficient strength of the seal case, particularly when the reciprocating pump has a large displacement.

SUMMARY OF THE INVENTION

Accordingly, an object of the present invention is to provide a seal device for a reciprocating pump which is capable of overcoming the above-described problems of the prior art.

To this end, according to the invention, there is provided a sealing device for a reciprocating pump of the type having a pump housing provided with a bore formed therein, the bore having at its one end an opening through which it communicates with the exterior of the pump housing while the other end receives a reciprocating member, the sealing device comprising: a seal case received in the bore; a sealing member held on the inner periphery of the seal case and having an inner peripheral surface adapted to be slidingly contacted by the outer peripheral surface of the reciprocating member; a closure removably attached to the pump housing so as to close the opening on the one end of the bore; and a coiled compression spring loaded between the closure and either one of the seal case and the sealing member.

Renewal of the sealing member is necessary when it has been worn down during long operation of the reciprocating pump.

The renewal can easily be conducted as follows. First of all, the closure is removed from the pump housing so as to make the opening in the pump housing accessible. Then, the compression spring is taken out of the pump housing through the opening and then the sealing member is dismounted together with the seal case through the opening by means of a suitable jig. In the reciprocating pump having this sealing device, the space where the compression spring is loaded, i.e., the space between the seal case and the closure, provides a space for passages of fluid between the pump chamber and the suction and delivery ports.

The above and other objects, features and advantages of the present invention will become clear from the following description of the preferred embodiment when the same is read in conjunction with the accompanying drawings.

DESCRIPTION OF THE PREFERRED EMBODIMENT

A preferred embodiment of the present invention will be described hereinunder with reference to the accompanying drawings.

Figure 1:
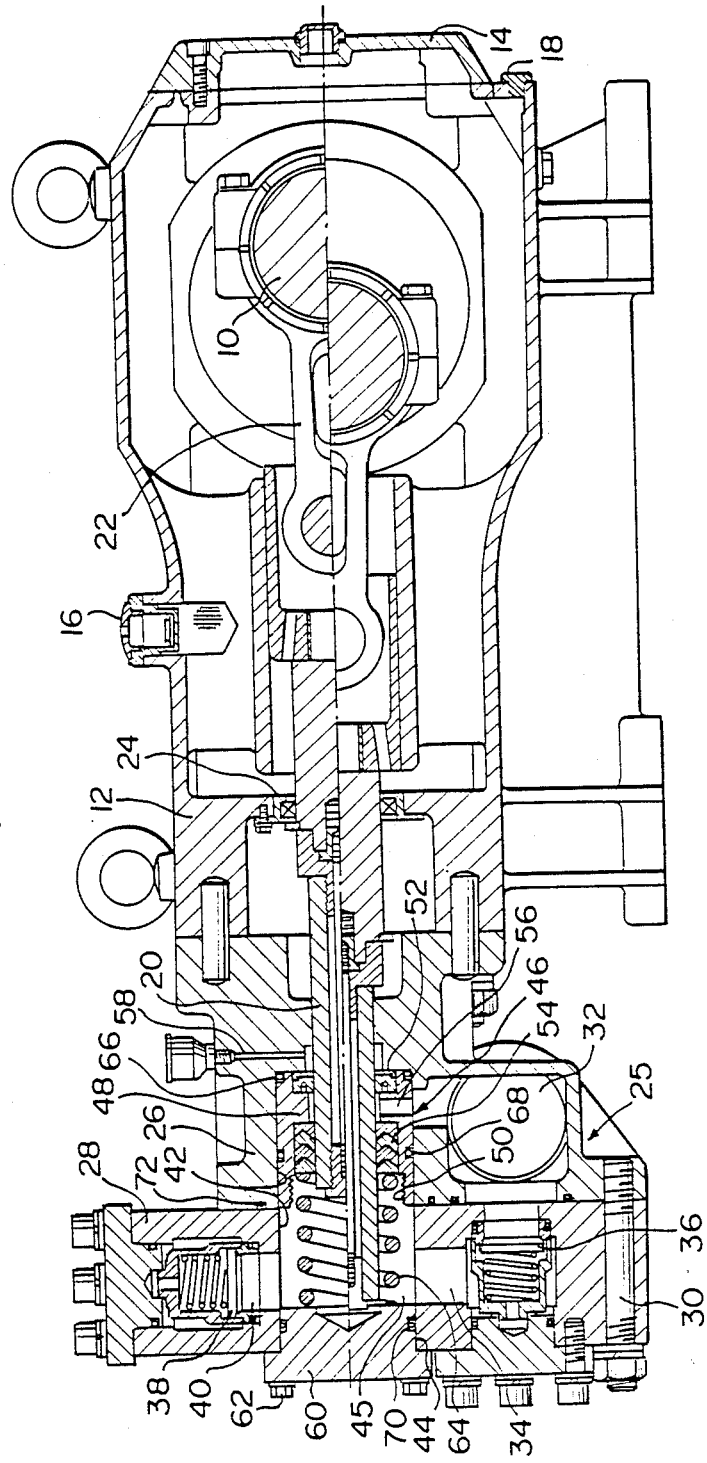
FIG. 1 is a longitudinal sectional view of a plunger pump incorporating a sealing device in accordance with the present invention.

FIG. 1 shows the whole of a plunger pump incorporating a sealing device embodying the present invention. The plunger pump has a crankshaft 10 mounted in a crank case 12. The end of the crank case 12 opposite to the plunger pump is closed by a cover 14. An oil filling port 16 and a drain port 18 are formed in an upper portion and a lower portion of the crank case 12, respectively. The oil filling port 16 is intended for charging fresh lubricating oil therethrough into the crank case 12, while the drain port 18 is intended for discharging degraded lubricating oil out of the crank case 12.

The plunger pump has a plunger 20 which is driven by the crankshaft 10 through a connecting rod 22 such as to reciprocate in accordance with the rotation of the crankshaft 10. An oil seal 24 is provided in the portion of the crank case 12 penetrated by the plunger 20 so as to prevent the internal fluid of the pump from leaking into the crank case 12.

The plunger pump also has a pump housing 25 including a first manifold 26 connected to the crank case 12 and having a bore which receives the plunger 20, and a second manifold 28 connected to the first manifold 26 by means of bolts 30. The first manifold 26 has a suction port 32 which communicates with a suction passage 34 formed in the second manifold 28 in which is disposed a suction valve 36 which is adapted to open the suction passage 34 when the plunger 20 is in suction stroke. A delivery valve 38 is provided in a delivery passage 40 formed in the second manifold 28 such as to open the delivery passage 40 when the plunger 20 is in the delivery stroke.

A bore 42 is formed in the pump housing 25 such that a portion of the bore 42 resides in the first manifold while the other portion of the same is in the second manifold 28. The bore 42 communicates with the exterior of the second manifold 28 through an opening 44 provided on one end thereof, while the other end of the bore 42 receives the end of the plunger 20 remote from the crank case 12. A pump chamber 45 is constituted by a portion of the bore 42, and communicates with the suction passage 34 and the delivery passage 40 in the second manifold 28.

A seal case 46 has a ridge 48 projecting inwardly from the axially mid portion of the inner peripheral surface thereof. The seal case 46 has a screw thread 50 formed in the end portion of the inner peripheral surface thereof adjacent to the open end 44 of the bore 42. A slight radial gap is left between the peripheral surface of the plunger 20 and the ridge 48 on the seal case 46. Stepped portions are formed on both sides of the ridge 48 as viewed in the direction of axis of the plunger 20. A low-pressure sealing member 52 and a high-pressure sealing member 54 are seated on the step adjacent to the crank case 12 and on the step adjacent to the opening 44, respectively. These sealing members have inner peripheral surfaces which slidingly contact with the outer peripheral surface of the plunger 20. In the embodiment shown in FIG. 1, the low-pressure sealing member 52 is composed of a U-shaped packing, while the high-pressure sealing member 54 is composed of a plurality of V-shaped packings stacked in the axial direction. A radial hole 56 is formed in the ridge 48 on the seal case 46 so as to extend radially, thereby introducing the liquid pressure available at the suction port 32 into a radial gap around the outer peripheral surface of the plunger 20 in the axial region between the low-pressure sealing member 52 and the high-pressure sealing member 54. A lubricating oil charging hole 58 is formed in the first manifold so as to extend in the radial direction of the manifold 26, so as to introduce a lubricating oil supplied from the outside of the first manifold 26 to the region where the low-pressure sealing member 52 is seated.

The opening 44 of the bore 42 is closed by a closure 60 which is detachably secured to the seond manifold 28 by means of bolts 62. A coiled compression spring 64 concentrically surrounds the plunger 20 and is loaded between the end of the high-pressure sealing member 54 and the closure 60, thereby urging the high-pressure sealing member into close contact with the ridge 48 on the seal case 46.

The seal case 46 is provided in the outer peripheral surface thereof with annular grooves which receive "O" rings, 66 and 68 which provide a liquid-tight deal between the suction port 32 and the radial hole 56. Another "O" ring 70 is provided in an annular groove formed in the outer peripheral surface of the closure 60, thereby preventing the fluid in the pump chamber 45 from leaking to the outside of the first manifold 26 through the small gap between the inner peripheral surface of the opening 44 and the outer peripheral surface of the closure 60. Still another "O" ring 72 is provided in annular grooves formed in the joint surfaces of the first and second manifolds 26 and 28 so as to prevent any leak of fluid through the gap between these joint surfaces.

Figure 2:
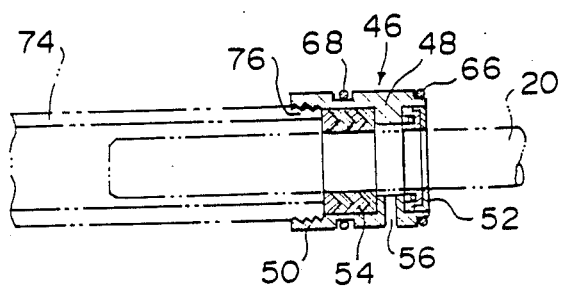
FIG. 2 is an illustration of a seal case incorporated in the sealing device and of a cylindrical jig engageable with the seal case.

FIG. 2 shows the detail of the seal case 46 together with a cylindrical jig engageable with the seal case 46. The cylindrical jig, denoted by 74, has a length large enough to reach the seal case 46 set in the pump housing 25 when inserted into the pump housing 25 from the exterior of the manifold 28 through the opening 44. The cylindrical jig 74 is hollow so that it can receive the end of the plunger 20 remote from the crank case 12. The cylindrical jig 74 is externally threaded at its inner end portion as viewed in FIG. 2 so as to be screwed into the thread 76 formed on the inner peripheral surface of the seal case 46.

As the reciprocating pump is used for a long period of time, the low- and high-pressure sealing members 52, 54 are worn down to become unusable, so that these sealing members 52 and 54 have to be renewed. The renewal of these sealing members is conducted in a manner which will be explained hereinunder. First of all, the bolts 62 are loosened and the closure 60 is separated from the second manifold 28, thereby making the opening 44 in the second manifold 28 accessible. Then, after taking the coiled spring 64 out of the second manifold 28, the cylindrical jig 74 is inserted into the pump housing 25 through the opening 44 and is screwed into the seal case 45 through screwing engagement between the external thread 76 on the jig and the internal thread 50 on the seal case 46. Then, the low- and high-pressure sealing members 52 and 54 are extracted to the outside of the second manifold 28 together with the seal case 46. After setting new high- and low-pressure sealing members 52 and 54 on the seal case 46, the cylindrical jig 74 is again screwed into the seal case 46 by screwing engagement between the external thread 76 on the jig 74 and the internal thread 50 on the seal case 46, and is inserted into the bore 42 through the opening 44 in the second manifold 28 so as to set the seal case 46 on the right position in the bore 42. Then, the cylindrical jig 74 is unscrewed to disengage the external thread 76 from the internal thread 50, and is extracted to the outside of the second manifold 28. Subsequently, the coiled spring 64 is set in the bore 42 and then the opening is closed by the closure 60.

Figure 3:
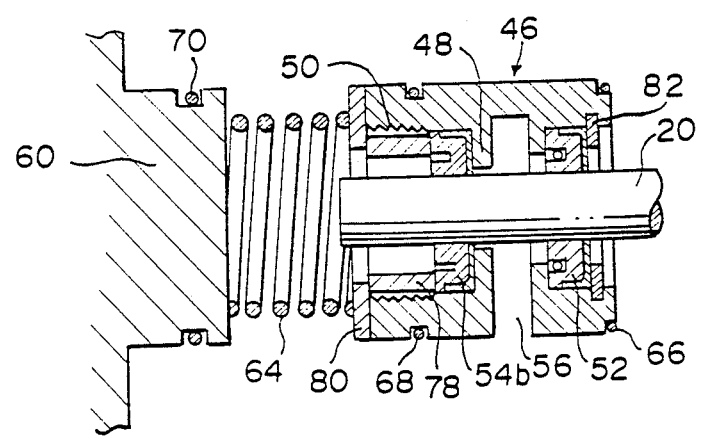
FIGS. 3 and 4 are illustrations of a different manner of fixing the seal case and a sealing member.

FIG. 3 shows another manner of fixing of the seal case and the sealing member. The high-pressure sealing member 54b is composed of a U-shaped packing. A collar 78 fits on the inner periphery of the seal case 46 and a spring seat 80 is placed in contact with the end surface of the seal case 46. A coiled compression spring 64 has both ends contacting the closure 60 and the spring seat 80, thus acting therebetween so as to urge the spring seat 80 towards the base end of the plunger 20. The biasing force exerted by the coiled spring 64 on the spring seat 80 causes the collar 78 to press the high-pressure sealing member 54b into close contact with the ridge 48 on the seal case 46. A stopper ring 82 fits in a groove formed in the inner peripheral surface of the seal case 46 at the axial end portion adjacent to the low-pressure sealing member 52, thereby fixing the low-pressure sealing member 52. In the case where the high-pressure sealing member 54 is constituted by a V-shaped packing as shown in FIG. 1, a large force is required for expanding the high-pressure sealing member 54 by a wedging male adapter. In contrast, the high-pressure sealing member 54b made of the U-shaped packing does not require any large pressing force, so that a sufficiently large sealing tightness is formed simply by pressing the packing onto the protrusion of the seal case by the axial force transmitted through the collar 78. In addition, the axial pressing margin of the high-pressure sealing member 54b can be adjusted by suitably selecting the axial length of the collar 78. In addition, the seal case 46 can be fixed rigidly because it is directly pressed by the coiled compression spring 64.

Figure 4:
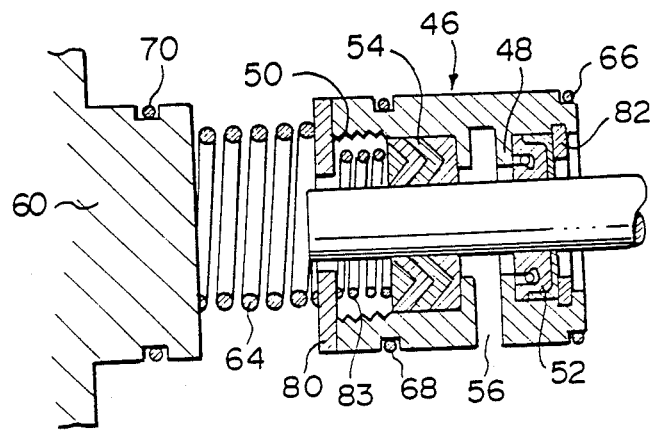

FIG. 4 shows still another form of fixing the seal case and the sealing members. In this case, a compression spring 83 is loaded in place of the collar 78 in the arrangement shown in FIG. 3. Thus, the compression spring 83 is loaded between the high-pressure sealing member 54 and the spring seat 80. The seal case 46 is rigidly fixed by the coiled compression spring 64 having a large spring constant, while the high-pressure sealing member composed of V-shaped packings is loaded by the coiled compression spring 83 which has a smaller spring constant than the coiled compression spring 64. Thus, the pressing force with which the sealing members are pressed is suitably adjusted.

Figure 5:
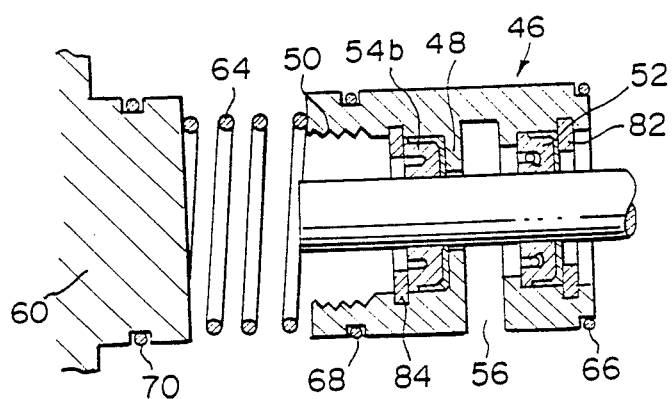
FIGS. 5 and 6 are illustrations of a different manner of fixing a high-pressure sealing member.

FIG. 5 shows a different form of fixing the high-pressure sealing member 54b. In this case, a stopper ring 84 fits in an annular groove formed in the inner peripheral surface of the seal case 46 so as to fix the high-pressure sealing member 54b. The stopper ring 84, in cooperation with the aforementioned stopper ring 82, serves to hold the high- and low-pressure sealing members 54b, 52 on the seal case 46, so that the seal case 46, low-pressure sealing member 52 and the high-pressure sealing member 54b are handled as a unit, thus facilitating storage and replacement.

Figure 6:
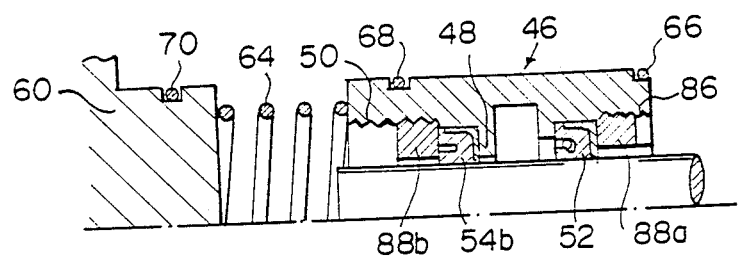

FIG. 6 shows a further form of fixing the high-pressure sealing member 54b. In this arrangement, the seal case 46 is internally threaded not only in the region surrounding the high-pressure sealing member 54b but also in the region surrounding the low-pressure sealing member 52. Externally-threaded members 88a and 88b are screwed into the seal case 46 in screwing engagement with the internal threads of the seal case, thereby fixing the low- and high-pressure sealing members 52 and 54b.

Figure 7:
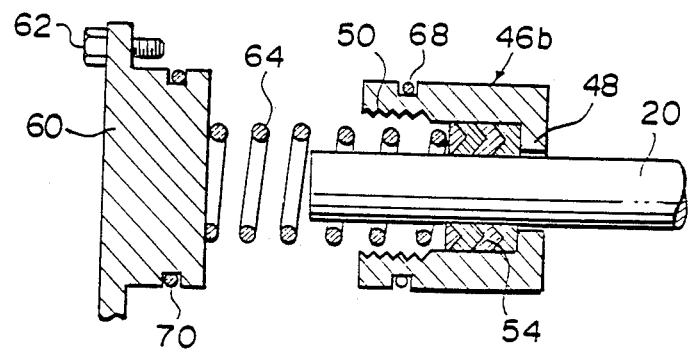
FIG. 7 is a sectional view of another example of the seal case.

FIG. 7 shows a modification of the seal case. The seal case 46P shown in this figure has only a portion for holding the high-pressure sealing member 54. Thus, the sealing device employing this seal case is devoid of the low-pressure sealing member.

Figure 8:
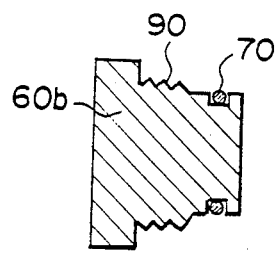
FIG. 8 is a sectional view of another example of a closure.

FIG. 8 shows an alternative of the closure for closing the opening 44 of the bore 42 formed in the second manifold 28. In this case, the closure 60b is provided with a screw thread 90 in the outer peripheral surface thereof, so as to be screwed into the opening 44 through screwing engagement between the external thread 90 on the closure 60b and internal thread formed in the inner peripheral surface of the opening 44. In this case, therefore, bolts 62 are not used. This arrangement can advantageously be used in the case where there is no sufficient space on the wall of the second manifold 28 for drilling bores which receive the bolts 62.

Figure 9:
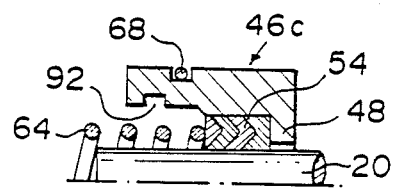
FIG. 9 is a sectional view of still another example of the seal case.

FIG. 9 shows another modification of the seal case. In this case, the seal case 46c is provided in the inner peripheral surface thereof with a retainer groove 92 in place of the internal screw thread 50. For the purpose of bringing the seal case 46c into and out of the pump housing 25 through the opening 44 in the second manifold 28, a suitable jig such as a wire of an appropriate length and having a hooked end is inserted and pulled such that the hooked end is retained by the groove 92.

The seal case may be further modified such that its diameter is reduced at the end thereof adjacent to the closure so that the screw thread 50 or the retaining groove 92 is formed on the outer peripheral surface of the thus reduced-diameter end portion of the seal case.

As will be understood from the foregoing description, the present invention provides a sealing device having a seal case capable of being inserted into and withdrawn from the pump housing through an opening in the pump housing. The seal case is required only to suitably hold the sealing members, while the function for closing the opening in the pump housing is performed by a closure which is formed as a member separate from the seal case. The pumping of the fluid into and out of the pump chamber is conducted in the region where the coiled compression spring is loaded, i.e., in the region between the seal case and the closure.

In consequence, the present invention offers the following advantages.

(a) In the conventional sealing device, the seal case having a seal holding portion and a closure portion essentially has passages which provide communication between the pump chamber and the suction and delivery ports. In the sealing device of the invention, in contrast to the conventional device, it is not necessary to form any passage in the seal case and the closure. The seal case as the means for holding the sealing member and the closure for closing the opening in the pump housing are formed separately from each other. Both the seal case and the closure have simple constructions and are small in size so that the production cost can be reduced advantageously.

(b) The seal case is not directly subjected to the high pressure generated in the pump chamber, so that the requirement for the strength of the seal case is not so severe.

(c) In general, the pump housing has a first manifold having a suction port and a second manifold having a delivery port and mounted on the end of the first manifold. The seal case in the sealing device of the invention need not be mounted in such a way as to extend over the first and the second manifolds, and is required to be seated only within the first manifold. This means that the seal case is not required to play the role of the means for centering the first and the second manifolds, which in turn eliminates the necessity for the high dimensional precisions which otherwise is required for the seal case and both manifolds for the purpose of centering.

(d) As explained before, it is not necessary to form a passage in the seal case for the purpose of attaining communication between the pump chamber and the suction and delivery ports. It is therefore possible to obtain a sufficiently large cross-sectional area of the passage between the pump chamber and the suction and delivery ports without impairing mechanical strength of the seal case, even when the pump has a large displacement.

What is claimed is:

1. A sealing device for a reciprocating pump of the type having a pump housing provided with a bore formed therein, said bore having at its one end an opening through which it communicates with the exterior of said pump housing while the other end receives a reciprocating member, said sealing device comprising:
   a seal case received within said bore;
   a first sealing member positioned on an inner periphery of said seal case and having an inner peripheral surface adapted to be slidingly contacted by an outer peripheral surface of said reciprocating member;
   a second sealing member positioned on an inner periphery of said seal case and having an inner peripheral surface adapted to be slidingly contacted by the outer peripheral surface of said reciprocating member and being spaced a predetermined distance from said first sealing member;
   a closure removably attached to said pump housing so as to close said opening on said one end of said bore; and
   a coiled compression spring loaded between said closure and either one of said seal case and said first sealing member for retaining said seal case and said first sealing member within said bore.

2. A sealing device according to claim 1, wherein said first sealing member is a high pressure seal.

3. A sealing device according to claim 1, wherein said second sealing member is a low pressure seal.

4. A sealing device according to claim 1, wherein said first sealing member includes a plurality of V-shaped packing members arranged adjacent to each other in an axial direction.

5. A sealing device according to claim 1, wherein said second sealing member is a U-shaped packing.

6. A sealing device according to claim 1, and further including a radial hole positioned in said seal case at a location between said first and second sealing members and being in communication with a suction port for draining excess lubricating oil therefrom.

7. A sealing device for a reciprocating pump according to claim 1, wherein said pump housing includes a first manifold having a suction port and a second manifold having a delivery port and mounted on one end of said first manifold.

8. A sealing device for a reciprocating pump according to claim 1, wherein said seal case has an engaging portion engageable with a tool inserted into said bore through said opening.

9. A sealing device according to claim 1, wherein a spring seat, having first and second faces, is located in contact with an end surface of said seal case and said coiled compression spring bears against first face of said spring seat.

10. A sealing device according to claim 9, wherein a first stopper ring is located in a groove in said seal case and bears against said second sealing member.

11. A sealing device according to claim 9, wherein a collar is located between said second face of said spring seat and said first sealing member.

12. A sealing device according to claim 9, wherein a second coiled compression spring is located between said second face of said spring seat and said first sealing member.

13. A sealing device according to claim 12, wherein a first stopper ring is located in a groove in said seal case and bears against said second sealing member.

14. A sealing device according to claim 1, wherein a first stopper ring is located in a first groove in said seal case and bears against said second sealing member,
   and a second stopper ring is located in a second groove in said seal case and bears against said first sealing member.

15. A sealing device according to claim 1, wherein said seal case has first and second internal threads extending from each end thereof, and
   first and second threaded members are threaded in said seal case and bear against said first and second sealing members respectively.

* * * * *